No. 650,294. Patented May 22, 1900.
O. P. BOULARD.
CUT-OFF DEVICE FOR HYDRANTS.
(Application filed Mar. 18, 1899.)
(No Model.)
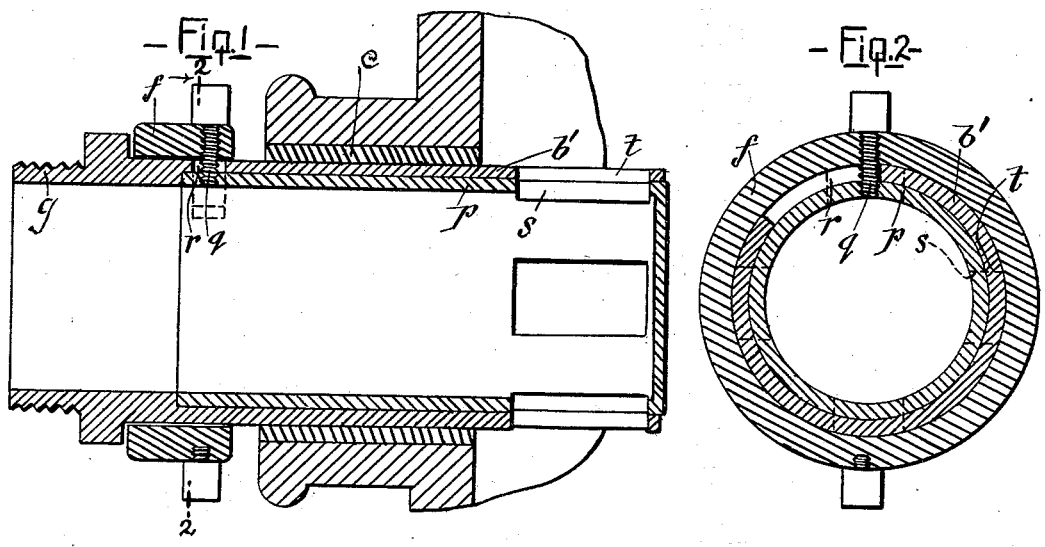
Witnesses
R. A. C. Kimler
Arthur T. Baker
Inventor
Oscar P. Boulard
By his Attorney
John N. Swan

UNITED STATES PATENT OFFICE.

OSCAR PIERRE BOULARD, OF MONTREAL, CANADA, ASSIGNOR OF ONE-HALF TO ZEPHERIN BENOIT, OF SAME PLACE.

CUT-OFF DEVICE FOR HYDRANTS.

SPECIFICATION forming part of Letters Patent No. 650,294, dated May 22, 1900.

Application filed March 18, 1899. Serial No. 709,678. (No model.)

*To all whom it may concern:*

Be it known that I, OSCAR PIERRE BOULARD, of the city of Montreal, Province of Quebec, Canada, have invented certain new and useful Improvements in Cut-Off Devices for Hydrants; and I do hereby declare that the following is a full, clear, and exact description of the same.

This invention relates to the cut-off device carried by each branch of a two or three branch hydrant, whereby the hose may be connected with either branch while the water is turned on; and the present invention has for its object to provide a cut-off or controller which can be operated quite independently of the hose and after the water-pressure is on and as long a time after the connection of the hose with the hydrant as may be desired. Heretofore the operation of such devices have been dependent upon the hose itself, there being usually a part of the device carried by the hose which acts upon other parts of the device in the branch of the hydrant; but such an arrangement is objectionable in that it not infrequently happens that the water is running through the hose before it is either securely connected or completely unwound from the fire-reel. The present invention, on the contrary and as before mentioned, secures an independent operation of the cut-off through an exterior actuating part permanently carried by the cut-off device of each branch of the hydrant and having an operative connection with the interior valve-section of the device, so that the hose can be connected with the branch without in any way affecting the cut-off and the latter operated whenever desired quite independently of the hose.

For full comprehension, however, of the invention reference must be had to the annexed drawings, forming a part of this specification, in which like symbols indicate corresponding parts, and wherein—

Figure 1 is a longitudinal vertical section of my improved cut-off device and the hydrant branch to which it is applied; Fig. 2, a transverse section of same on line 2 2, Fig. 1.

The essential features of my improved cut-off device are an interior movable valve-section and an actuating part which can be operated independently of the hose and having an operative connection with the valve-section.

A sleeve $b'$ is secured by lead packing $c$ or otherwise within the branch $d$ of the hydrant $e$, the sleeve projecting beyond the outer end of the branch sufficiently to receive the valve-actuating part in the form of a ring $f$, and also to present a screw-threaded end portion $g$, upon which the hose is coupled. The actuating-ring $f$ is shown as operatively connected with the valve-section, in this case rotatory and in the form of a cylinder or sleeve $p$, by pin connection $q$ between the ring and the outer end of such sleeve, the inner or valve end proper of which is formed with a number of slits or openings $s$ to register with corresponding slits $t$ in the sleeve $b'$, and such sleeve $b'$ being slotted at its forward end, as at $r$, to accommodate the pin $q$, taking into the ring $f$. A modification of the foregoing, comprising a series of rods for operating the interior valve-section, constitutes a divisional half of the present application, filed October 12, 1899, under Serial No. 733,445.

What I claim is as follows:

1. A cut-off device for hydrants located within the branches or outlets thereof and having a main sleeve fixedly set in the branch and presenting an outer end screw-threaded to allow of the hose being coupled thereto; an interior valve-section and exterior actuating part to be operated independently of the hose ends that may be coupled to the main sleeve and an operative connection between said actuating part and the interior valve-section substantially as described.

2. A cut-off device for hydrants located within the branches or outlet thereof and comprising a main sleeve set in the branch and having slots at its inner end and a slot near its outer end and such outer end screw-threaded to allow of the hose being coupled thereto; an inner sleeve also having its inner end slotted to register with the slots in the inner end of the main sleeve and acting as a rotatory valve-section, and an actuating-pin secured to the forward end of the inner sleeve and projecting through the slot in the forward end of the main sleeve, substantially as described.

3. A cut-off device for hydrants located within the branches or outlet thereof and comprising a main sleeve *b* set in the branch *d* and having slots *t* at its inner end and a slot *r* near its outer end and such outer end screw-threaded to allow of the hose being coupled thereto; an inner sleeve also having its inner end slotted, as at *s*, to register with the slots *t* in the inner end of the main sleeve and acting as a rotatory valve-section, a ring *f*, and an actuating-pin *q* secured to the forward end of the inner sleeve and projecting through the slot in the forward end of the main sleeve, and into said ring *f*, substantially as described.

In testimony whereof I have affixed my signature in presence of two witnesses.

OSCAR PIERRE BOULARD.

Witnesses:
 OWEN N. EVANS,
 WILLIAM P. MCFEAT.